United States Patent [19]

Larjola

[11] Patent Number: 4,558,228
[45] Date of Patent: Dec. 10, 1985

[54] ENERGY CONVERTER

[76] Inventor: Jaakko Larjola, Jouseno, 54190 Konnunsuo, Finland

[21] Appl. No.: 509,442
[22] PCT Filed: Oct. 8, 1982
[86] PCT No.: PCT/FI82/00042
 § 371 Date: Jun. 6, 1983
 § 102(e) Date: Jun. 6, 1983
[87] PCT Pub. No.: WO83/01482
 PCT Pub. Date: Apr. 28, 1983

[30] Foreign Application Priority Data

Oct. 13, 1981 [FI] Finland ............... 813164

[51] Int. Cl.⁴ .......................... F01K 11/04
[52] U.S. Cl. ......................... 290/52; 290/2; 290/43; 60/646; 60/657; 384/107; 384/121
[58] Field of Search .............. 290/2, 43, 52, 54; 60/715, 652, 655, 659, 657, 646, 669; 308/DIG. 1; 384/107, 121

[56] References Cited

U.S. PATENT DOCUMENTS

| | | | |
|---|---|---|---|
| 2,535,454 | 12/1950 | Rawlias | 384/121 |
| 2,602,632 | 7/1952 | Serduke et al. | 308/DIG. 1 |
| 2,961,550 | 11/1960 | Dittman | 290/2 |
| 3,061,733 | 10/1962 | Humpal | 290/2 |
| 3,105,631 | 10/1963 | Hänny | 384/107 X |
| 3,938,863 | 2/1976 | Victor et al. | 384/107 |
| 3,950,950 | 4/1976 | Doerner et al. | 60/657 |
| 4,187,685 | 2/1980 | Tsuji et al. | 290/52 X |
| 4,355,850 | 10/1982 | Okano | 384/121 |
| 4,362,020 | 12/1982 | Meacher et al. | 60/657 |
| 4,365,759 | 12/1982 | Morishita et al. | 308/DIG. 1 X |
| 4,366,993 | 1/1983 | Ono et al. | 308/DIG. 1 X |
| 4,389,847 | 6/1983 | Kehlhofer | 60/659 |
| 4,410,220 | 10/1983 | Robinson | 308/DIG. 1 X |

FOREIGN PATENT DOCUMENTS

| | | |
|---|---|---|
| 0018266 | 4/1980 | European Pat. Off. |
| 2048106 | 4/1971 | Fed. Rep. of Germany |
| 2709048 | 7/1978 | Fed. Rep. of Germany |
| 315603 | 7/1968 | Sweden |
| 385423 | 6/1976 | Sweden |

OTHER PUBLICATIONS

Barden Gas Bearing, by The Barden Corp., 200 Park Ave., Danbury, Conn. 06813.

Primary Examiner—William M. Shoop, Jr.
Assistant Examiner—Shik Luen Paul Ip
Attorney, Agent, or Firm—Steinberg & Raskin

[57] ABSTRACT

The invention concerns an energy converter, comprising a boiler, a turbine (11), a condenser, a feed pump (16) and a generator (17) and, if required, a recuperator and a pre-feeding pump. The thermal energy to be supplied to the boiler has been arranged to maintain a Rankine process driving the generator (17) and thus to produce electricity. The turbine (11), the generator (17) and the feed pump (16) have a joint rotor shaft (36). The rotor (36) is rotatably carried with gas-dynamic bearings (24) utilizing the circulating fluid's vapor. The lower surface of the rotor (21) of the turbine (11) has been disposed to serve as one abutment surface of a gas-static thrust bearing (22). The gas-dynamic bearings (24) are bearings of tilting pad type.

7 Claims, 3 Drawing Figures

4,558,228

ENERGY CONVERTER

BACKGROUND OF THE INVENTION

The present invention concerns an energy converter comprising a boiler, a turbine, a condenser, a feed pump and a generator and, if needed, a recuperator and a pre-feeding pump, in said energy converter the thermal energy to be supplied to the boiler having been arranged to maintain a cyclic process driving the generator and thereby to produce electricity, and in said energy converter the turbine, generator and feed pump having a joint rotor.

Ample quantities of high-grade waste heat are released by industry and by ships, such as flue gases and hot process gases. The energy contained in these cannot often be utilized directly as heat energy, among other things because of great transport distances and/or surplus supply of heat energy at the site producing the waste energy. It is for his reason that particularly in the U.S.A. and in the U.K., where there is little district heating activity, development work has been started on an energy converter for converting this waste heat into electricity. It is based on the conventional power plant process wherein an organic liquid is used as circulating fluid instead of water. The existing state of art will become apparent e.g. by reference to: Giglioli, G. et al: Tetrachloro-ethylene Rankine cycle for waste heat recovery from ceramic tunnel kilns, SAE/P-78/75, 1978 and to U.S. Pat. Nos. 3,061,733 and 2,961,550.

The planned and constructed experimental plants are however usually based on conventional power plant technology, in other words, they comprise an impulse turbine, speed changing gears, slip ring seals, a lubrication system, a vacuum pump, etc. This implies that they require maintenance, their efficiency is low and they are expensive. In hermetic designs (in the U.S. patents cited above) liquid-lubricated bearings have been employed, which at the very high speeds of rotation involved wear out relatively fast and also require a special pipe system to convey the lubricating liquid of the present invention is to achieve an improvement in these energy converters of prior art. A more detailed object of the invention is to provide an energy converter the Rankine process of which is totally enclosed, thereby obviating seals and vacuum pumps, and wherein the bearing arrangement has been carried out with virtually wear-free gas bearings (with continuous service life more than 100,000 hrs), of which the radial bearings function with the ambient process fluid vapour, and that for turbine and feed pump are used inexpensive single-stage radial machines in which the lower surface of the turbine rotor constitutes one abutment face of a gas thrust bearing. In this manner the converter has been rendered maintenance-free and, moreover, low in price owing to its simplicity. Furthermore, the minimal friction of a gas bearing, compared with liquid-lubricated ones, improves the efficiency of the turbo-generator. The other objectives of the invention and the advantages gained by it will be apparent in the disclosure of the invention.

The objectives of the invention are attained by means of an energy converter which is mainly characterized in that the shaft has been rotatably carried with gas-dynamic bearings using the vapour of the circulating fluid, and that the lower surface of the turbine rotor has been disposed to serve as one abutment face of a gas-static thrust bearing.

The energy converter of the invention may be provided with valves, and the condenser placed at a suitable elevation so that the apparatus is able to start on thermal power alone.

BRIEF DESCRIPTION OF THE DRAWINGS

The invention is described in detail by referring to an advantageous embodiment of the invention presented in the figures of the drawings attached, to which, however, the invention is not meant to be exclusively confined.

DETAILED DESCRIPTION OF THE PREFERRED EMBODIMENT

Figure 1:
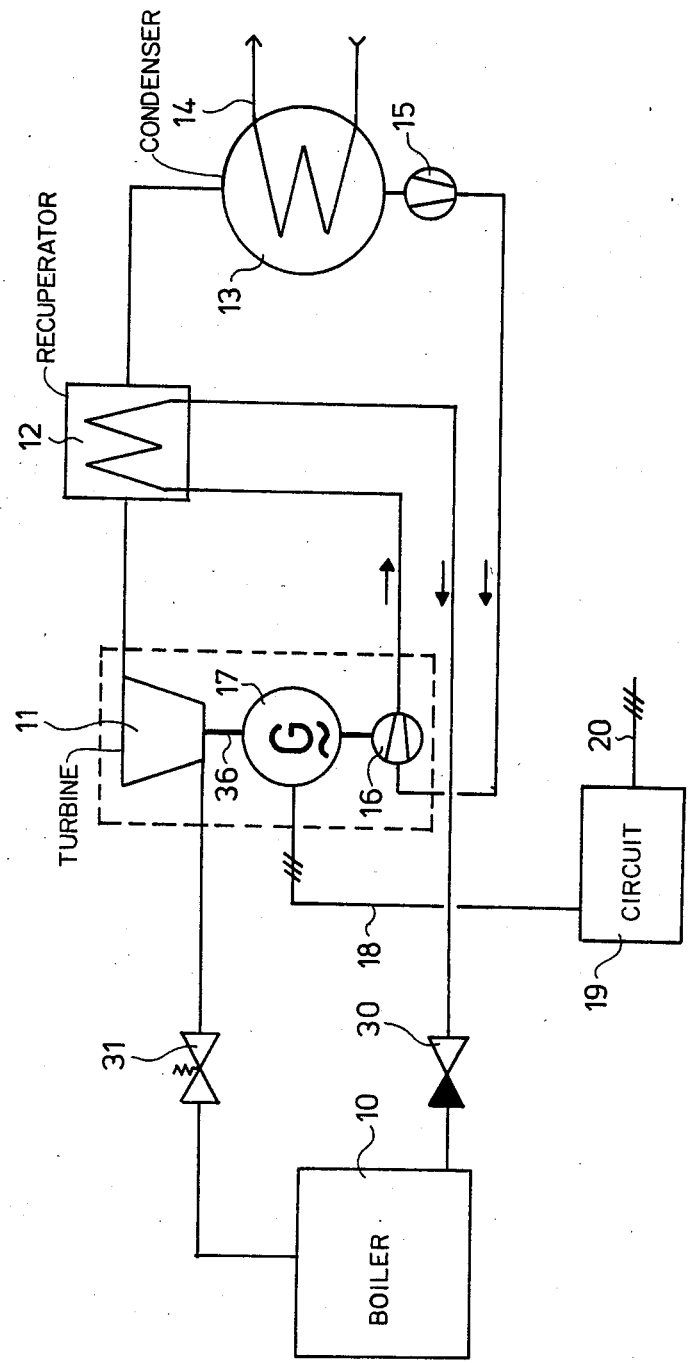
FIG. 1 presents the flow circuit of the energy converter of the invention.

The general design of the energy converter according to the invention depicted in FIG. 1 is as follows. The circulating fluid, for instance $C_2Cl_3F_3$, is evaporated with the aid of waste heat energy in the boiler 10; it expands in the turbine 11, cools down in the recuperator 12 (which may or may not be provided) and condenses in the condenser 13, in which e.g. raw water or outdoor air serves as the condensation-inducing fluid 14. The feed pump 16 feeds the circulating fluid directly or through the recuperator 12 (if incorporated in the process) back to the boiler 10. The circuit moreover comprises a prefeeding pump 15 to counteract cavitation in the feed pump 16. The high frequency current 18 produced by the generator 17 is converted by the circuit 19 to become a stabilized current 20 fit to be fed into the standard electric network. If an asynchronous machine is used for generator, the electric circuit 19 also supplies the magnetizing current. The turbine 11, the generator 17 and the feed pump 16 have a joint rotor shaft 36.

Figure 2:
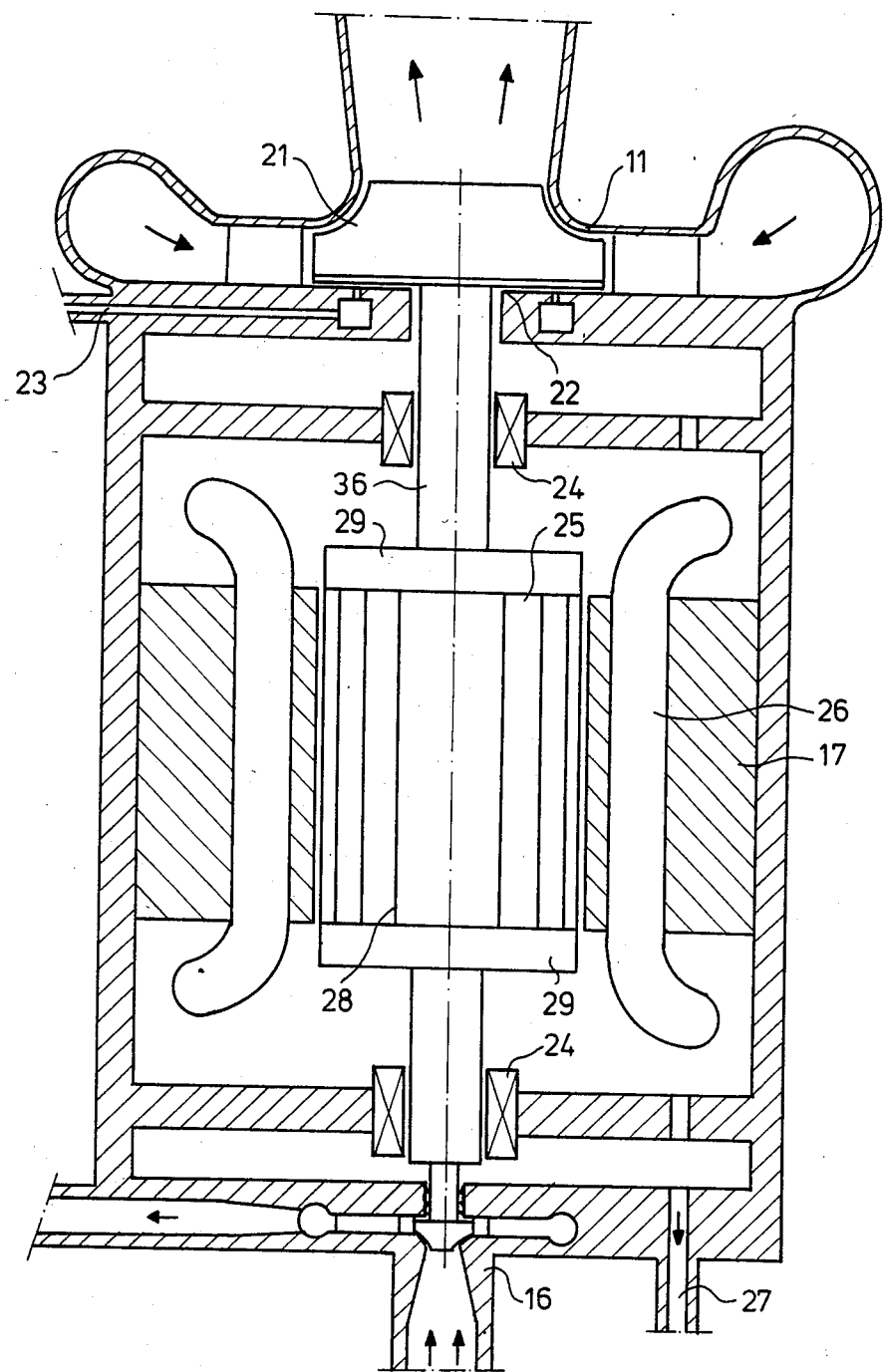
FIG. 2 presents an advantageous embodiment of the central part of the energy converter of FIG. 1, i.e., the combination of turbo-generator and feed pump, in schematic sectional view.

In FIG. 2 are shown the salient components of the combination of the turbo-generator and feed pump set apart in FIG. 1 with dotted lines. The expansion of the circulating fluid vapour takes place in the radial turbine 11, the lower surface of its rotor 21 at the same time serving as one surface of the gas-static thrust bearing 22. In this manner, the thrust bearing could be made exceedingly simple of its construction and, in addition, turbulence losses at the turbine disk are avoided. The supporting gas film in the bearing in question is produced with fresh vapour 23. The type of the generator 17 may be either an asynchronous machine, in which case the rotor 25 must have some kind of squirrel-cage winding and the stator 26 must be supplied with magnetizing power e.g. through a capacitive circuit, or the generator may a synchronous machine, in which case the rotor 25 has been permanently magnetized. The radial bearings 24 are gas-dynamic bearings, operating with the ambient process fluid vapour, without separate supply. The bearings 24 of the gas-dynamic type are preferably tilting pad bearings (in German: Kippsegmentlager) which are stable even at very high angular velocities and simultaneous minor radial loads. Ordinary ball bearings would wear our very rapidly, as would liquid-lubricated hydrodynamic bearings; and the conventional hydrodynamic bearings or conventional gas bearings would in addition be unstable in the mode of loading here concerned. The feed pump 16 is a single-stage turbo pump with contactless seal. The leakage flow 27 is returned to the condenser 13.

The squirrel-cage winding of the rotor 25 of the asynchronous generator may be formed in that simply axial grooves 28 have been cut in a steel cylinder and short-circuiting rings 29 e.g. of copper have been mounted on the ends. A design like has great advantages of structural strength in high-speed asynchronous machines.

Figure 3:
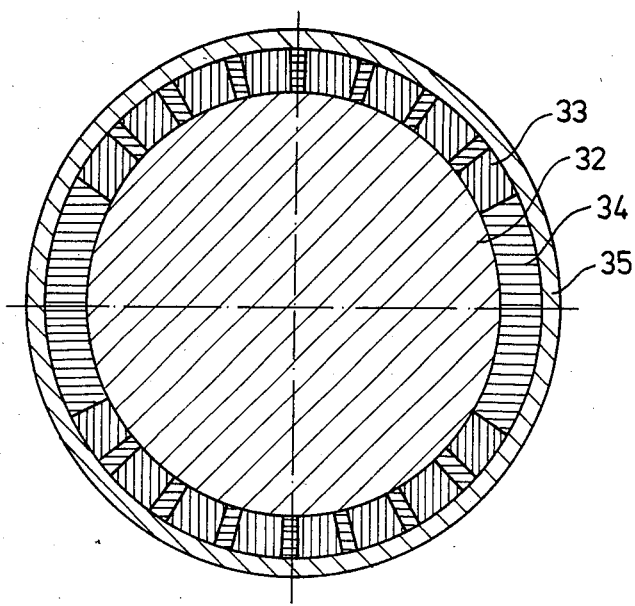
FIG. 3 shows the schematic cross section of the generator rotor of the means of FIG. 2 in the case in which the generator is a synchronous machine.

The permanently magnetized rotor of the synchronous generator may be constructed, considering the enormous centrifugal forces, in the following way. As shown in FIG. 3, upon the steel cylinder 32 constituting the rotor is mounted a sleeve 34, made of aluminium or another non-magnetic material, and powerful permanent magnets 33, made e.g. of samarium/cobalt, are embedded in the sleeve 34 to extend just into contact with the cylinder 32 and to produce two or more poles on the rotor. Finally, to prevent detachment of the pieces, a band 35 made of a very strong, non-magnetic material, such as reinforced plastic, is applied tightly over the sleeve. A structure able to stand the immense centrifugal forces of a high-speed rotor has hereby been obtained.

The boiler 10, the recuperator 12 (if any) and the condenser 13 may be positioned so that after the circulation is interrupted, enough liquid may flow into the boiler 10 via the check valve 30 to suffice as it is evaporated to run the joint rotor of the turbo-generator and feed pump up to operating speed and thus to start up the apparatus on thermal power alone. The valve 31 ensures adequate initial pressure.

As can be understood from the preceding disclosure, the apparatus is a completely hermetic entity: nothing is carried out from the process but the electrical leads, and the bearing arrangements from the turbine, generator and feed pumps have been managed with gas films involving no abrasion of metallic surfaces. The pre-feeding pump 15 can be made hermetically sealed and maintenance-free by conventional technique (submerged pumps; ball bearings lubricated by the circulating fluid) thanks to the low operating pressure required. Therefore the invention meets the requirements imposed regarding freedom of maintenance, and calculations have shown that with its aid low costs per unit are achievable for the entire energy converter, as a result of the high efficiency of single-state radial machines and of the simple design of the turbo-generator and feed pump.

Only one advantageous embodiment of the invention has been presented in the foregoing and it is obvious to a person skilled in the art that this may be modified in numerous different ways within the scope of the inventive idea stated in the claims following below.

I claim:

1. In an energy converter, comprising a feed pump having a pump rotor, a generator having a generator rotor, and a gas turbine having a turbine rotor driven by vapor of a circulating fluid, the feed pump rotor, generator rotor, and turbine rotor being mounted on a joint rotatable shaft, the improvement comprising
   said joint shaft being rotatably mounted in gas-dynamic bearings utilizing the vapor of the circulating fluid,
   said turbine rotor having a lower surface, a portion of which constitutes an abutment surface of a gas-static thrust bearing in which said joint shaft is mounted,
   said shaft being disposed to extend substantially vertically, and
   the feed pump, generator, and turbine being mounted on the joint shaft in that order, from bottom to top.

2. Energy converter according to claim 1, wherein the gas-dynamic bearings are bearings of tilting pad type.

3. Energy converter according to claim 1 or 2, wherein the generator is a brushless asynchronous machine, the squirrel-cage winding of its rotor formed by making longitudinal grooves in a steel cylinder and by mounting on the ends of the cylinder, rings of good conductivity, and an electric circuit is disposed to supply to the stator of the generator the requisite magnetizing current.

4. Energy converter according to claim 1 or 2, wherein the generator is an asynchronous machine provided with a permanent magnetic rotor in which pieces of permanent magnet material are embedded in a sleeve of non-magnetic material, the sleeve being mounted on a steel cylinder constituting the rotor to extend just into contact with the steel cylinder and to cause magnetic poles to be established on the rotor, and the sleeve being surrounded by a band of an exceedingly strong, non-magnetic material.

5. Energy converter according to claim 1 or 2, wherein both the turbine and the feed pump are single-stage radial machines and the generator is a brushless synchronous or asynchronous machine.

6. Energy converter according to claim 1 or 2, further comprising a boiler and a condenser positioned so that when circulation of the circulating fluid is interrupted, enough circulating liquid flows through a check valve into the boiler to be evaporated and then drive the joint rotatable shaft up to operating speed, thus starting up the energy converter under thermal power alone.

7. The energy converter according to claim 6, additionally comprising a recuperator.

* * * * *